United States Patent
Sciacca

(10) Patent No.: US 7,444,538 B2
(45) Date of Patent: Oct. 28, 2008

(54) FAIL-OVER CLUSTER WITH LOAD-BALANCING CAPABILITY

(75) Inventor: Vincenzo Sciacca, Rome (IT)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/225,679

(22) Filed: Sep. 13, 2005

(65) Prior Publication Data

US 2006/0080569 A1    Apr. 13, 2006

(30) Foreign Application Priority Data

Sep. 21, 2004    (EP)    ................................... 04104556

(51) Int. Cl.
*G06F 11/00*    (2006.01)
(52) U.S. Cl. ............................. 714/4; 714/13
(58) Field of Classification Search ...................... 714/4, 714/11, 13
See application file for complete search history.

(56) References Cited

U.S. PATENT DOCUMENTS

| | | | |
|---|---|---|---|
| 6,560,717 B1* | 5/2003 | Scott et al. ..................... | 714/4 |
| 6,728,896 B1* | 4/2004 | Forbes et al. .................... | 714/4 |
| 7,287,186 B2* | 10/2007 | McCrory et al. .............. | 714/13 |
| 2005/0097394 A1* | 5/2005 | Wang et al. ................... | 714/11 |
| 2005/0268156 A1* | 12/2005 | Mashayekhi et al. ........... | 714/4 |
| 2006/0015773 A1* | 1/2006 | Singh et al. ................... | 714/13 |

\* cited by examiner

*Primary Examiner*—Marc Duncan
(74) *Attorney, Agent, or Firm*—Garg IP Group, Inc.; Rakesh Garg; Jeffrey S. Labaw

(57) ABSTRACT

A solution for distributing the workload across the servers (105) in a fail-over cluster (for example, based on the MSCS) is proposed. A fail-over cluster is aimed at providing high availability; for this purpose, a resource service (205) automatically moves each resource (220) that exhibits some sort of failure to another server in the cluster. The proposed solution adds a monitor (240) that periodically measures a responsiveness of each resource. If the responsiveness of a resource is lower than a threshold value, the monitor inquiries a metrics provider (245) for determining the workload of all the servers in the cluster. The monitor then causes the resource service to move that resource to the server having the lowest workload in the cluster.

2 Claims, 5 Drawing Sheets

FAIL-OVER CLUSTER WITH LOAD-BALANCING CAPABILITY

TECHNICAL FIELD

The present invention relates to the data processing field. More specifically, the present invention relates to a method for clustering data processing resources in a fail-over cluster. The invention further relates to a computer program for performing the method, and to a product embodying the program. Moreover, the invention also relates to a corresponding fail-over cluster and to a data processing system including the fail-over cluster.

BACKGROUND ART

Data processing systems with distributed architecture have become increasingly popular in the last years, particularly following the widespread diffusion of the Internet. In a distributed system, client computers exploit services offered by server computers across a network.

Two or more servers can be grouped into a cluster, so as to appear as a single computer to the clients; the cluster provides a single point of management and facilitates the scaling of the system to meet increasing demand. The clustering techniques known in the art can be classified into two distinct categories, which conform to the load-balancing model or the fail-over model, respectively.

The load-balancing clusters tend to optimize the distribution of the workload across the servers. Particularly, in a cluster of the network load balancing type the incoming requests from the clients are distributed across the servers, which share a single (virtual) network address. On the other hand, in a cluster of the component load balancing type any application is mirrored on all the servers; in this way, any request received from the clients is forwarded to the server that is best suited to its handling.

Conversely, the fail-over clusters are aimed at providing high availability. For this purpose, whenever a resource (providing a corresponding service) experiences a failure its operation is taken over by another server (which is predefined during the configuration of the cluster). Particularly, in a fail-over cluster of the shared-nothing type every resource is replicated on all the servers; however, only one server at the time can own the resource. Otherwise, in a fail-over cluster of the shared-everything type all the servers are given equal access to the resources (through a distributed lock manager that grants the access in mutual exclusion). A typical example of service that implements a fail-over cluster supporting the shared-nothing style is the Microsoft Windows Cluster Service (MSCS); the MSCS is described in detail in "Introducing Microsoft Cluster Service (MSCS) in the Windows Server 2003 Family"—Mohan Rao Cavale—November 2002, which is available at "http://www.msdn.microsoft.com/library".

However, the load-balancing clusters and the fail-over clusters are based on completely different approaches that are incompatible to each other.

Particularly, the fail-over clusters (such as the ones based on the MSCS) lack any support for distributing the workload across the servers.

Therefore, even though the fail-over clusters known in the art provide a high availability they are completely ineffective in increasing the performance of the system.

SUMMARY OF THE INVENTION

According to the present invention, the addition of load-balancing capability to a fail-over cluster is suggested.

Particularly, an aspect of the present invention provides a method for clustering data processing resources in a fail-over cluster. The cluster includes a plurality of data processing nodes. A cluster service is used for moving each resource from a node to a further node in response to the failing of the resource on the node; this operation is performed by taking offline the resource on the node and bringing online the resource on the further node. The method involves measuring one or more responsiveness parameters indicative of the responsiveness of each resource. When the responsiveness of at least one resource is not compliant with a predefined criterion, the workload of each node is determined. In this case, a still further node is selected according to the workload of the nodes. The cluster service is then caused to move the at least one resource from the node to the still further node.

The proposed solution combines the advantages of both the load-balancing clusters and the fail-over clusters (notwithstanding their completely different approaches); in other words, this solution allows overcoming the incompatibilities of the two available models.

As a result, the fail-over cluster can also distribute the workload across the servers.

In this way, the cluster ensures high availability and high performance at the same time.

The preferred embodiments of the invention described in the following provide additional advantages.

For example, without detracting from its general applicability, the proposed solution has been specifically designed for a cluster of the shared-nothing type (where each resource is always online on at most one single node).

In a typical embodiment of the invention, the workload of the nodes is determined by measuring one or more workload parameters directly on each node of the cluster.

In this way, the resource is always moved to the best node in the cluster.

As a further enhancement, a monitor is associated with each resource (for measuring the corresponding responsiveness parameters); in this case, the cluster service is also caused to move each monitor from the node to the still further node in response to the moving of the corresponding resource.

The proposed feature provides a monitoring on-demand of the resources.

A way to further improve the solution is that of locking the still further node during the moving of the resource (so as to prevent bringing online other resources on the still further node).

This additional feature allows taking into account the impact of the resource on the workload of the still further node (before moving any other resource).

A suggested choice for implementing this feature is that of using a provider that is available on each node for determining the corresponding workload. Particularly, the monitor associated with the resource notifies the start of bringing online the monitor to the provider; the provider locks the still further node in response to the notification of the start. Later on, the monitor associated with the resource notifies the end of bringing online the monitor to the provider; the provider can now unlock the still further node in response to the notification of the end.

The proposed solution is very simple, but at the same time effective and of general applicability.

A further aspect of the present invention provides a computer program for performing the above-described method.

A still further aspect of the invention provides a program product embodying this computer program.

A different aspect of the invention provides a corresponding fail-over cluster.

Moreover, another aspect of the invention provides a data processing system including the fail-over cluster.

The novel features believed to be characteristic of this invention are set forth in the appended claims. The invention itself, however, as well as these and other related objects and advantages thereof, will be best understood by reference to the following detailed description to be read in conjunction with the accompanying drawings.

BRIEF DESCRIPTION OF THE DRAWINGS

FIGS. 3a-3e show a diagram describing the flow of activities relating to an illustrative implementation of the method.

DETAILED DESCRIPTION OF THE PREFERRED EMBODIMENT(S)

Figure 1A:
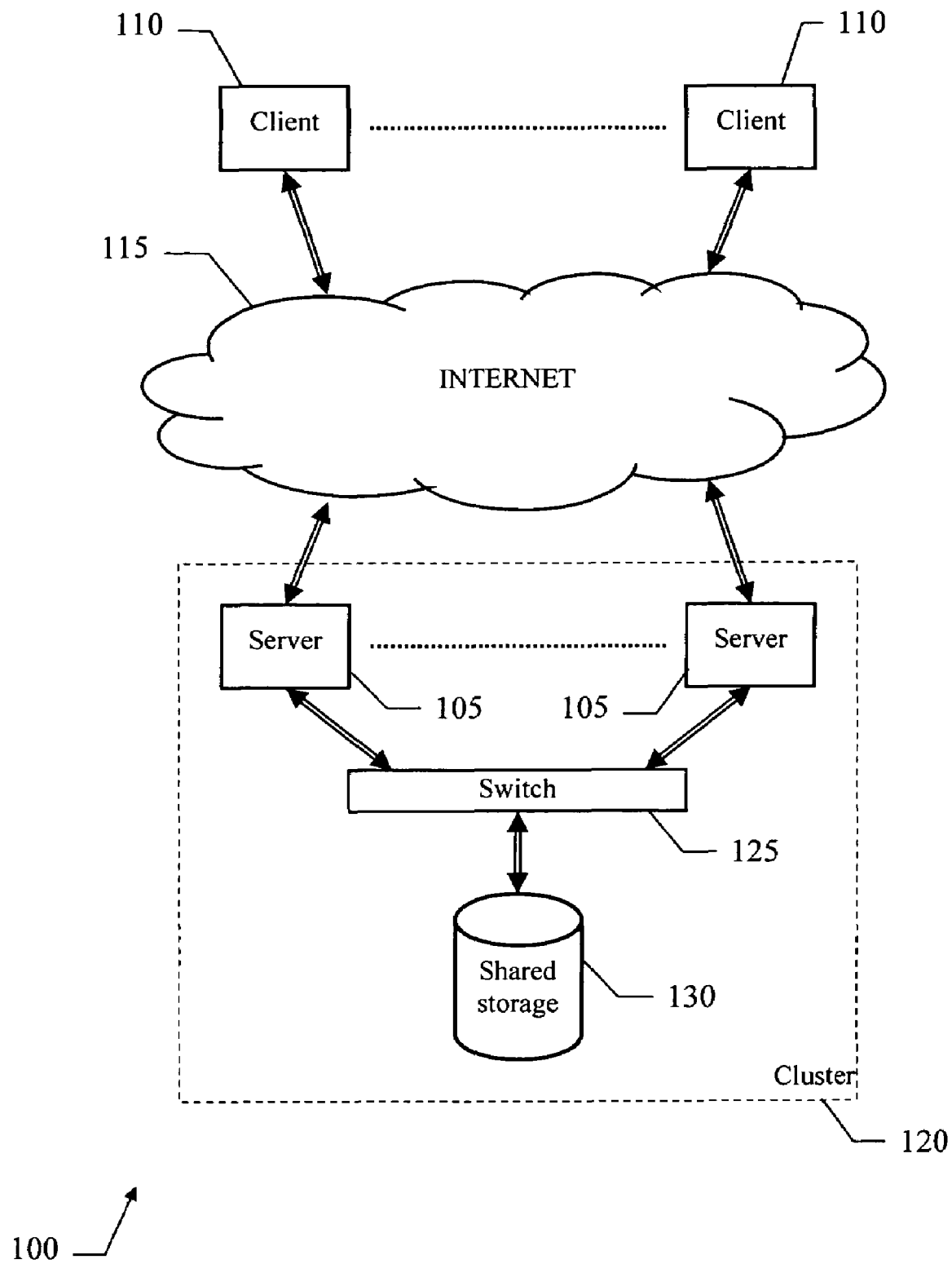
FIG. 1a is a schematic block diagram of a data processing system in which the method of the invention is applicable.

With reference in particular to FIG. 1a, a data processing system 100 with distributed architecture is illustrated. The system 100 is based on a client/server model; particularly, server computers 105 offer shared services for client computers 110, which access those services through a communication network 115 (typically Internet-based). Each service is provided by a corresponding resource, which can consist of any physical or logical component (such as a disk, a network address, a database, a file, an application program, and the like).

Multiple servers 105 (for example, from 2 to 8) are connected together to define a fail-over cluster 120 of the shared-noting type (for example, implemented through the MSCS). Each server 105 (defining a node of the cluster 120) is coupled with a switch 125. The switch 125 allows the servers 105 to access a shared storage 130 in mutual exclusion.

Each resource of the cluster 120 can be owned by any server; this means that the resource is installed on all the servers 105 if logical or it is connected to all the servers 105 if physical. However, the resource is online (i.e., it is available for use) on only one server at any time. Every request from the clients 110 is received by an active server, which then routes it to the correct server for its handling. A fail-over process is performed whenever a resource experiences some sort of failure (for example, because it is not working or the corresponding server breaks down). The failing resource is moved to another (predefined) server in the cluster 120; for this purpose, the failing resource is taken offline on the (original) server, i.e., it is not available for use any longer, and it is brought online on the (fail-over) server. As a result, the requests from the clients 110 for that resource are automatically routed to the fail-over server that now hosts the resource. In this way, the resource will be always available to the clients 110 (with little or no interruption). Typically, each resource can also be moved from the original server to another server of the cluster 120 directly by an administrator of the system 100 or under the control of a program (for example, when some maintenance operations must be performed on the original server).

Figure 1B:
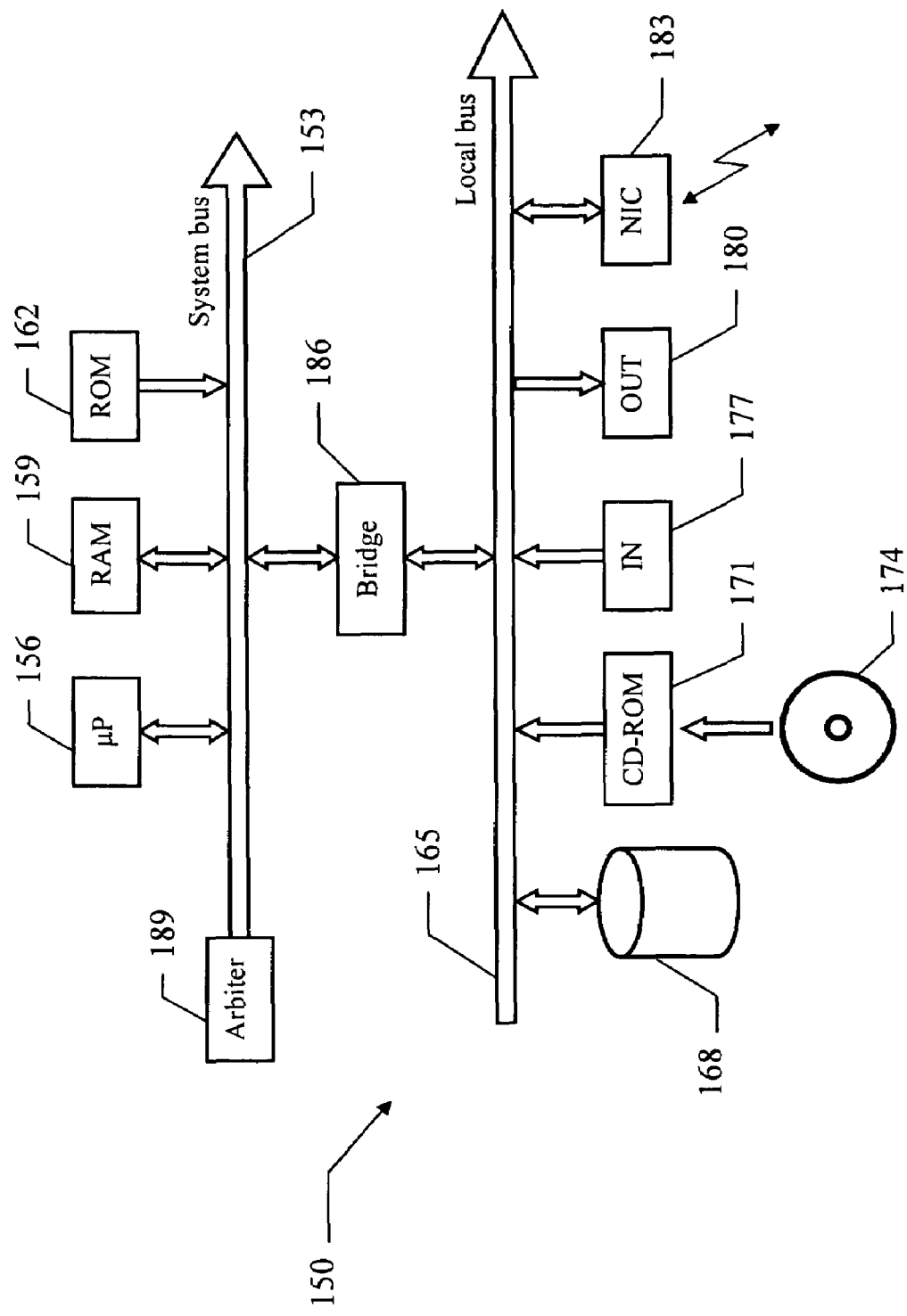
FIG. 1b illustrates the functional blocks of a generic computer of the system.

As shown in FIG. 1b, a generic computer of the system (server or client) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
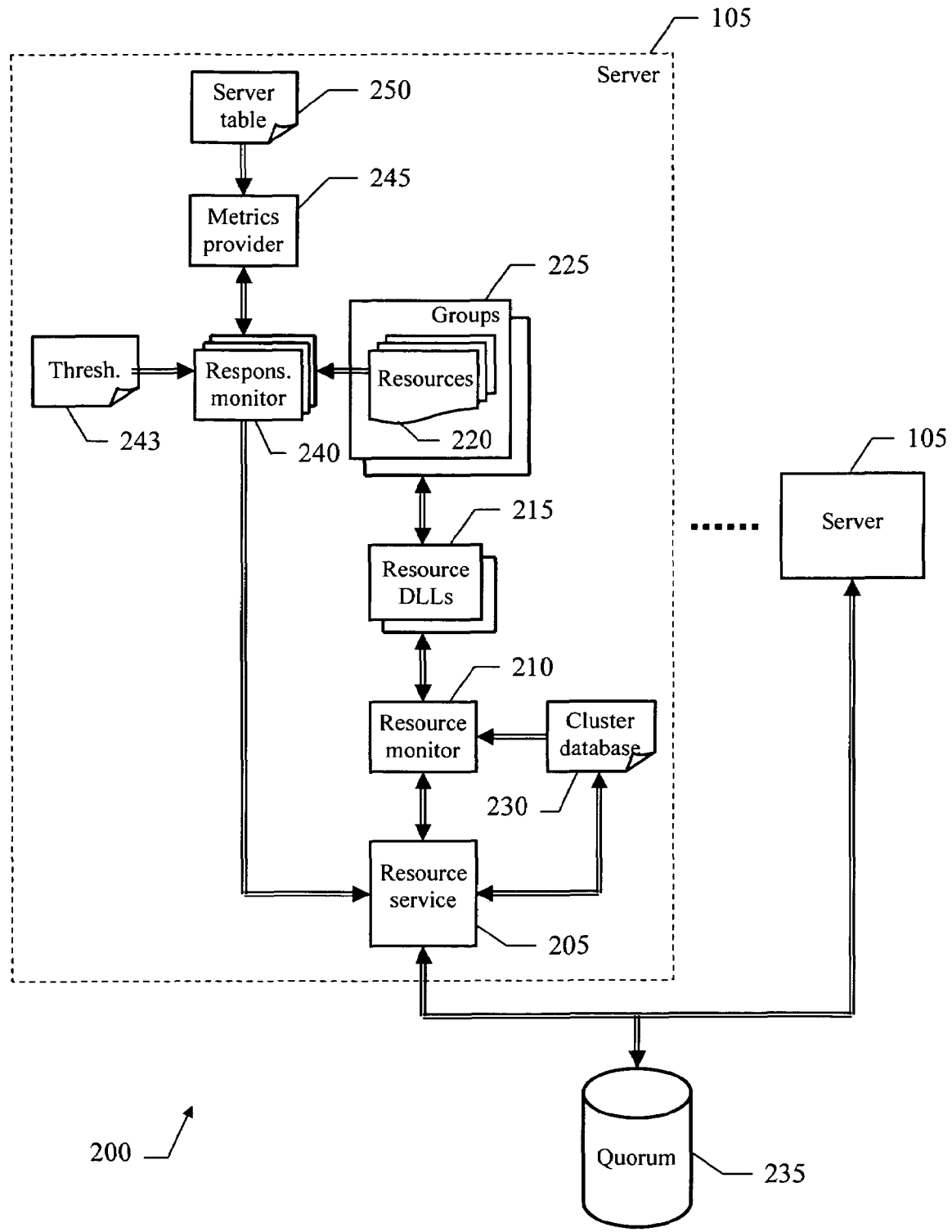
FIG. 2 depicts the main software components that can be used for practicing the method.

Moving now to FIG. 2, the main software components that can be used for practicing the invention are denoted as a whole with the reference 200. The information (programs and data) is typically stored on the hard disks and loaded (at least partially) into the corresponding working memories when the programs are running. The programs are initially installed onto the hard disks from CD-ROMs.

Each server 105 runs a resource service 205 (as a high-priority system service). The resource service 205 controls all the activities relating to the membership of the server 105 to the cluster. Particularly, the resource service 205 is used to execute the operations required by the clients on the resources (that are online on the server 105), to manage communication with the other servers of the cluster (for example, to exchange a heartbeat that confirms the availability of the servers), and to handle fail-over operations.

The resource service 205 executes the required operations on each resource through a resource monitor 210 (which is assigned to the resource). Each resource monitor 210 runs as an independent process (so as to shield the resource service 205 from any problem caused by the resources); preferably, more instances of the resource monitor 210 run on the server 105 for isolating specific resources (for example, when their behavior is unpredictable).

The resource monitor 210 loads a resource DLL 215 (into its process) for each type of resource (such as drives for hardware components or generic applications). Each resource DLL 215 exposes a series of functions (i.e., Application Program Interfaces, or APIs) to the resource monitor 210; each API implements the desired operation on the corresponding resources. Particularly, an "IsAlive" API verifies whether the resource is available for use, an "Online" API brings the resource online, whereas an "Offline" API takes the resource offline. The resources that implement their own resource DLLs 215 are defined as cluster-aware. The other resources that do not provide specific resource DLLs (defined as cluster-unaware) can still be configured into the cluster by using a generic resource DLL. The generic resource DLL supports a very basic control of each cluster-unaware resource; for example, the generic resource DLL verifies the availability of the resource by determining whether the corresponding process exists and takes the resource offline by closing its process.

The resources (denoted with 220) can be combined into groups 225. The resources 220 of each group 225 are managed as a unit during a fail-over process; in other words, whenever a resource 220 of the group 225 fails and it is moved to its fail-over server, all the resources 220 of the group 225 are moved as well. Moreover, it is also possible to establish dependencies among the resources 220 of the same group 225.

The information relating to the configuration of the cluster is registered in a corresponding database 230. Particularly, the cluster database 230 identifies the servers 105 in the cluster, the resource monitor 210 and the resource DLL 215 assigned to each resource 220, the current state of each resource 220, and the fail-over server to which each resource 220 must be moved. The cluster database 230 is accessed by the resource service 205 (in order to identify the resource monitor 210 to be used for executing a requested operation on a specific resource 220, to determine the fail-over server for a failing resource 220, and to load the current state of a resource 220 that is brought online on the server). Likewise, the cluster database 230 is also accessed by the resource monitor 210 (in order to identify the resource DLL 215 to be loaded for managing a specific resource 220). The resource service 205 replicates any changes to the cluster database 230 into a persistent memory structure 235 (called quorum), which is stored in the shared storage of the cluster; those changes are then propagated to the cluster databases of all the other servers in the cluster.

The server 105 is further provided with a monitoring engine, for example, the IBM Tivoli Monitoring (ITM) by IBM Corporation. Particularly, each resource 220 is associated with a responsiveness monitor 240 (which is implemented as a further resource of the cluster). The responsiveness monitor 240 measures one or more parameters indicative of the responsiveness of the corresponding resource 220; for example, the responsiveness parameters consist of the duration of a transaction executed by a software application, of the latency of a disk, and the like. Whenever the responsiveness parameter of a generic resource 220 reaches a predefined threshold value (stored in a corresponding table 243), this (slow) resource 220 is moved to another server; for example, in a software application this happens when the duration of the transactions exceeds an acceptable value defined by a Service Level Agreement (SLA).

For this purpose, the responsiveness monitor 240 exploits a metrics provider 245. The metrics provider 245 determines one or more parameters indicative of the workload of each server in the cluster; for example, the workload parameters consist of the processing power usage, the memory space occupation, the network activity, the amount of input/output operations, and the like. Particularly, the metrics provider 245 directly measures the workload parameter of its server 105; moreover, the metrics provider 245 inquiries the metrics providers of the other servers in the cluster (identified in a table 250) for collecting the corresponding workload parameters.

The metrics provider 245 returns the information so obtained to the responsiveness monitor 240. The responsiveness monitor 240 selects the server in the cluster having the lowest workload parameter, and then causes the resource server 205 to move the slow resource 220 (together with the corresponding responsiveness monitor 240) to the selected server.

Figure 3A:
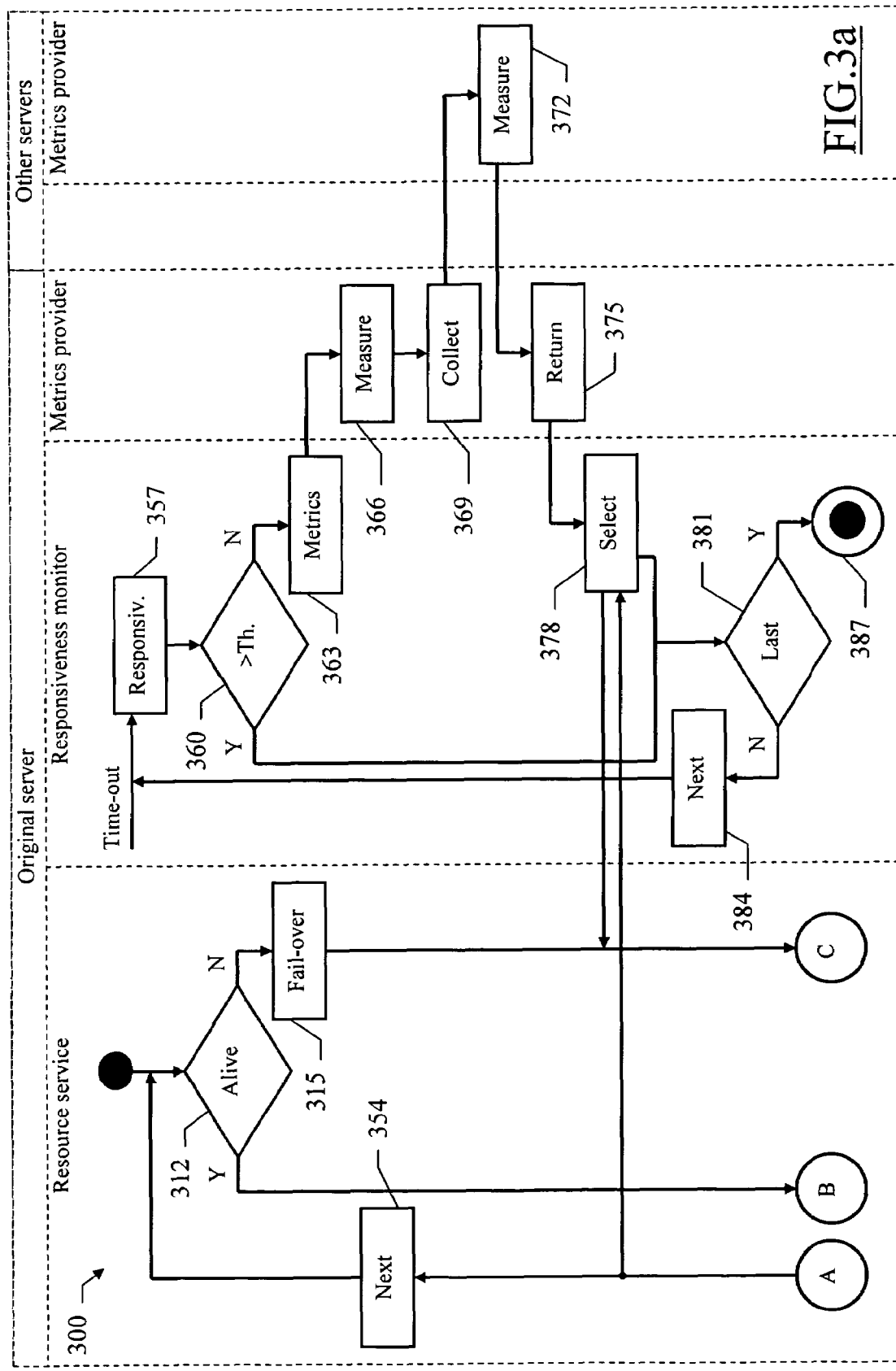
Figure 3B:
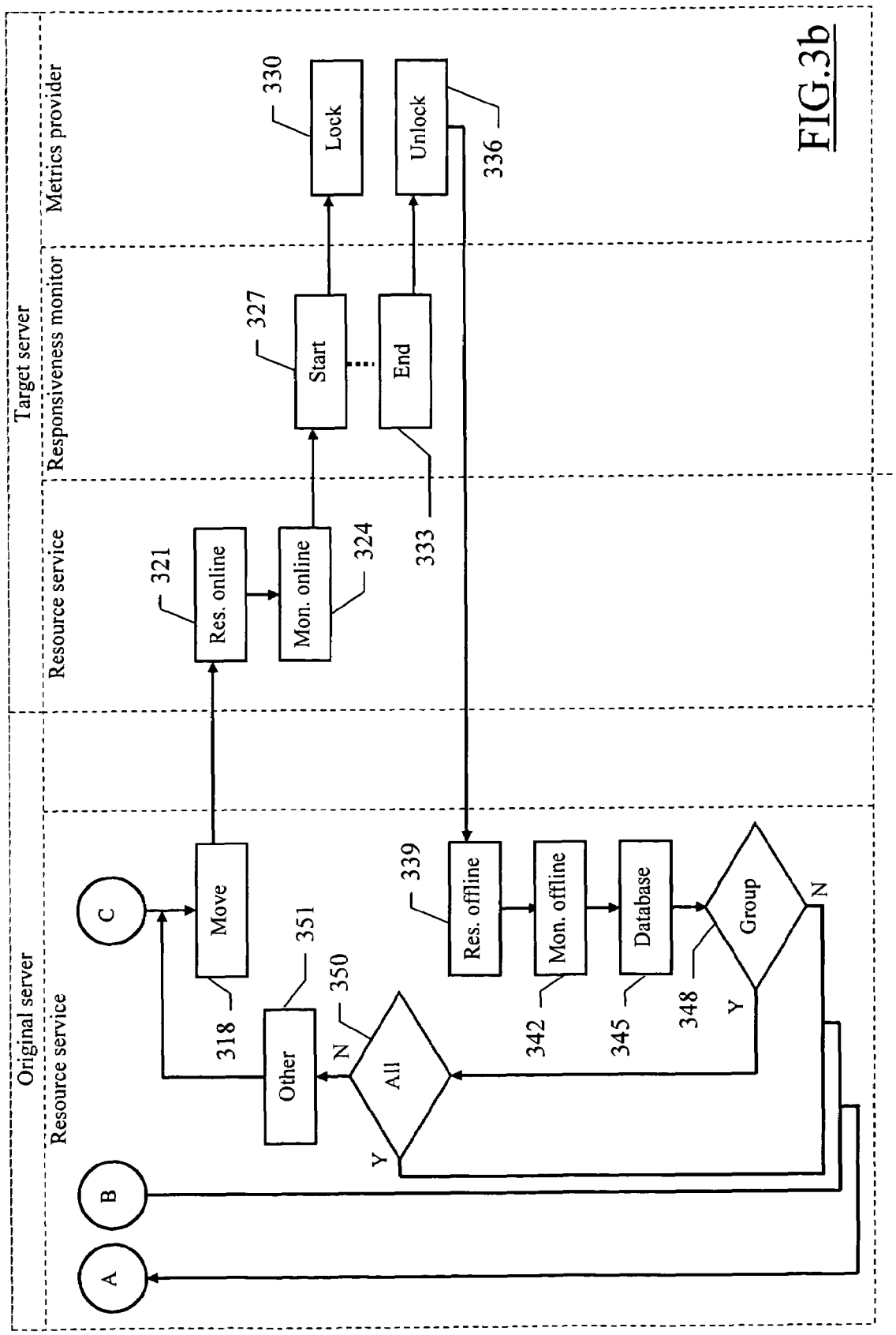

Considering now FIGS. 3a-3b, the logic flow of a clustering method according to an embodiment of the invention is represented with a method 300. The method begins at the black start circle 303 in the swim-lane of the resource service of a generic server in the cluster. A loop is continually repeated for ensuring the availability of the resources of the cluster. The loop begins at block 306, wherein a test is made to determine whether a current resource (among the ones online on the server) is actually available; this operation is performed by requesting the resource monitor assigned to the online resource to call the "IsAlive" API on the corresponding resource DLL. If the result of the test is negative, a fail-over process starts at block 315; first of all, the resource service (on the original server) determines the fail-over server assigned to the failing resource (as indicated in the cluster database). The failing resource is then moved from the original server to the fail-over server at blocks 318-351 (described in the following). Afterwards, a next online resource is selected at block 354; the same point is also reached from block 312 directly when the online resource is alive. The method then returns to block 312 for repeating the above-described operations on the next online resource.

Concurrently, the responsiveness monitor is periodically enabled (whenever a predefined time-out expires, for example, every 1s). In response thereto, a loop is performed for each online resource (starting from the first one); the loop begins at block 357, wherein the responsiveness parameter of the online resource is measured. The responsiveness parameter of the online resource is then compared at decision block 360 with its threshold value (extracted from the corresponding table).

If the responsiveness parameter is lower that the threshold value, this slow resource is moved to another server. For this purpose, at block 363 the responsiveness monitor requests the workload parameters of all the servers in the cluster to the metrics provider. In response thereto, the metrics provider directly measures the workload parameter of the (original) server at block 366. Continuing to block 369, the metrics provider requests the same information to the metrics providers on the other servers in the cluster. The method then proceeds to block 372, wherein each one of those metrics providers measures the workload parameter of its server and passes the information to the metrics provider on the original server. Moving to block 375, the metrics provider on the original server returns the collected workload parameters (for all the servers in the cluster) to the corresponding responsiveness monitor. The responsiveness monitor can now select (at block 378) the server in the cluster having the lowest workload parameter. The slow resource is then moved from the original server to the selected server at blocks 318-351 (described in the following).

Afterwards, a test is made at block 381 to determine whether the last online resource has been processed. If not, a next online resource is selected at block 384; the method then returns to block 357 for repeating the same operations on the next online resource. Conversely, once all the online resources have been verified the responsiveness monitor is disabled, with the method that ends at the concentric white/black stop circles 387.

The process of moving any resource (i.e., a failing resource or a slow resource) from the original server to the fail-over server or to the selected server, respectively (generically called target server in the following) is now described in detail with reference to blocks 318-351. The process begins at block 318, wherein the resource service on the original server sends a corresponding message to the resource service on the target server. In response thereto, the resource service on the target server brings the resource online at block 321 (by causing the resource monitor assigned to the resource to call the "Online" API on the corresponding resource DLL); the same operation is also performed whenever the original server breaks down (i.e., when the corresponding heartbeat is not received by the fail-over server within a predefined delay). The responsiveness monitor assigned to the resource is likewise brought online at block 324.

As soon as the process of the responsiveness monitor is started on the target server (block 327), the event is notified to the corresponding metrics provider. In response thereto, the metrics provider at block 330 locks the target server (for example, by setting a corresponding flag in the corresponding table); in this way, the target server cannot be selected for moving other resources. Once the operation of bringing online the responsiveness monitor ends, the metrics provider is notified accordingly at block 333. The metrics provider then unlocks the target server at block 336 (by resetting the corresponding flag), so as to make it available again for moving other resources.

Returning to the swim-lane of the resource service on the original server (block 339), the resource can now be taken offline (by causing the resource monitor assigned to the resource to call the "Offline" API on the corresponding resource DLL). The responsiveness monitor assigned to the resource is likewise taken offline at block 342. Continuing to block 345, the cluster database is updated accordingly (to indicate that the resource is now available on the target server instead of the original server); the changes are then replicated into the quorum and propagated to all the servers in the cluster.

The method continues to block 348, wherein a test is made to determine whether the resource is included in a group. If so, the method verifies at block 350 whether all the other resources of the group have already been moved to the target server. If not, another resource of the group (starting from the first one) is selected at block 351. The flow of activity then returns to block 318 in order to repeat the above-described operations for the other resource of the group. The process of moving the resource ends when the resource is not included in any group (block 348) or once all the other resources of the group have been moved to the target computer (block 350). In both cases, the method returns to block 354 (when the process has been invoked following a failure of the resource) or to block 378 (when the process has been invoked by the responsiveness monitor).

Although the present invention has been described above with a certain degree of particularity with reference to preferred embodiment(s) thereof, it should be understood that various omissions, substitutions and changes in the form and details as well as other embodiments are possible. Particularly, it is expressly intended that all combinations of those elements and/or method steps that substantially perform the same function in the same way to achieve the same results are within the scope of the invention. Moreover, it should be understood that specific elements and/or method steps described in connection with any disclosed embodiment of the invention may be incorporated in any other embodiment as a general matter of design choice.

Particularly, similar considerations apply if the cluster has a different structure (for example, with a majority server that stores the cluster database so as to allow clustering geographical dispersed servers), or if the servers are replaced with any other data processing nodes; likewise, the cluster can be managed by an equivalent service (i.e., whatever module capable of serving requests). Moreover, even though in the preceding description reference has been made to the MSCS, this is not to be intended as a limitation (with the invention that can be applied in general to any other fail-over cluster).

Alternatively, different criteria are used for deciding when a resource must be moved (for example, if a running average of its responsiveness parameter reaches a threshold value). In any case, the proposed solution can be extended to situations wherein two or more resources are managed as a single set (from the load-balancing point of view); in other words, all the resources of the set are moved to another server when a predefined function of the corresponding responsiveness parameters does not meet the predefined criterion (for example, if their sum reaches a threshold value).

Likewise, the responsiveness of the resources and/or the workload of the servers can be determined in another way (for example, calculating a parameter from a set of corresponding measured indicators). It is also possible to implement more sophisticated algorithms for selecting the server where the slow resource must be moved (for example, taking into account multiple factors).

Moreover, the servers can be locked with different techniques (in order to prevent bringing online other resources); a typical example is that of disabling operation of the metrics provider for the desired time interval.

In any case, the programs and the corresponding data can be structured in a different way, or additional modules or functions can be provided; moreover, it is possible to distribute the programs in any other computer readable medium (such as a DVD).

Similar considerations apply if the system has a different architecture or is based on equivalent elements, if each computer has another structure or is replaced with any data processing entity (such as a PDA, a mobile phone, and the like).

Moreover, it will be apparent to those skilled in the art that the additional features providing further advantages are not essential for carrying out the invention, and may be omitted or replaced with different features.

For example, the use of the proposed solution in a cluster where each resource can be online on two or more servers at the same time is not excluded.

Moreover, it is possible to select the server where the resource must be moved with other criteria (for example, based on an estimation of the workload of the servers).

In any case, an implementation of the proposed solution without moving the responsiveness monitors is contemplated.

Moreover, the servers can be locked in another way (for example, disabling them for a predefined period after the start of the process associated with the resource being brought online).

In any case, the solution of the invention is also suitable to be implemented without locking the servers during the moving of the resources.

Alternatively, the programs are pre-loaded onto the hard disks, are sent to the servers through the network, are broadcast, or more generally are provided in any other form directly loadable into the working memories of the servers.

However, the method according to the present invention leads itself to be carried out with a hardware structure (for example, integrated in chips of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for clustering data processing resources in a fail-over cluster including a plurality of data processing nodes and a cluster service for moving each resource from a node to a further node, by taking offline the resource on the node and bringing online the resource on the further node, in response to the failing of the resource on the node, wherein the method is characterized by the steps of:
- measuring at least one responsiveness parameter indicative of the responsiveness of each resource,
- determining the workload of each node in response to the non-compliance of the responsiveness of at least one resource with a predefined criterion,
- selecting a still further node according to the workload of the nodes,
- causing the cluster service to move the at least one resource from the node to the still further node; and
- locking the still further node during the moving of the resource to prevent bringing online other resources on the still further node.

2. The method according to claim 1, wherein a provider is available on each node for determining the corresponding workload, the step of locking the still further node including:
- the monitor associated with the resource notifying the start of bringing online the monitor to the provider,
- the provider locking the still further node in response to the notification of the start,
- the monitor associated with the resource notifying the end of bringing online the monitor to the provider,
- the provider unlocking the still further node in response to the notification of the end.

* * * * *